(12) United States Patent
Sakamoto et al.

(10) Patent No.: US 12,011,756 B2
(45) Date of Patent: Jun. 18, 2024

(54) METHOD FOR MANUFACTURING PRESS-MOLDED ARTICLE

(71) Applicant: KABUSHIKI KAISHA KOBE SEIKO SHO (KOBE STEEL, LTD.), Hyogo (JP)

(72) Inventors: Kazuki Sakamoto, Kobe (JP); Kenichi Watanabe, Kobe (JP); Dongyong Shi, Kobe (JP)

(73) Assignee: KOBE STEEL, LTD., Hyogo (JP)

( * ) Notice: Subject to any disclaimer, the term of this patent is extended or adjusted under 35 U.S.C. 154(b) by 847 days.

(21) Appl. No.: 17/053,423

(22) PCT Filed: May 13, 2019

(86) PCT No.: PCT/JP2019/018848
§ 371 (c)(1),
(2) Date: Nov. 6, 2020

(87) PCT Pub. No.: WO2020/003767
PCT Pub. Date: Jan. 2, 2020

(65) Prior Publication Data
US 2021/0229156 A1   Jul. 29, 2021

(30) Foreign Application Priority Data
Jun. 26, 2018   (JP) ................. 2018-121198

(51) Int. Cl.
*B21D 37/08*   (2006.01)
*B21D 5/01*   (2006.01)
(Continued)

(52) U.S. Cl.
CPC ............... *B21D 37/08* (2013.01); *B21D 5/01* (2013.01); *B21D 22/26* (2013.01); *B21D 24/10* (2013.01); *B62D 25/04* (2013.01)

(58) Field of Classification Search
CPC .......... B21D 5/01; B21D 22/26; B21D 24/10; B21D 35/006; B21D 37/08
See application file for complete search history.

(56) References Cited

U.S. PATENT DOCUMENTS 5,941,110 A * 8/1999 Cao ................. B21D 22/22
72/21.4
2002/0041050 A1   4/2002 Jung et al.
(Continued)

FOREIGN PATENT DOCUMENTS

DE   10 2016 013466 A1   5/2017
JP   2011-083807 A   4/2011
(Continued)

OTHER PUBLICATIONS

Notification of Transmittal of Translation of the International Preliminary Report on Patentability and Translation of Written Opinion of the International Searching Authority; PCT/JP2019/018848; mailed on Jan. 7, 2021.
(Continued)

*Primary Examiner* — Teresa M Ekiert
(74) *Attorney, Agent, or Firm* — Studebaker & Brackett PC

(57) ABSTRACT

A method for manufacturing a press-molded article includes: preparing a patchwork blank in which a thickened portion is formed by welding patchwork to basework; bending only the thickened portion of the patchwork blank; and bending a portion other than the thickened portion in a step different from bending of the thickened portion.

9 Claims, 7 Drawing Sheets

(51) Int. Cl.
     *B21D 22/26*      (2006.01)
     *B21D 24/10*      (2006.01)
     *B62D 25/04*      (2006.01)

(56) References Cited

U.S. PATENT DOCUMENTS

| | | | |
|---|---|---|---|
| 2012/0304448 A1* | 12/2012 | Hartmann | B32B 15/013 72/364 |
| 2017/0333972 A1 | 11/2017 | Nishimura et al. | |
| 2018/0078986 A1 | 3/2018 | Suzuki et al. | |
| 2019/0176204 A1 | 6/2019 | Suzuki et al. | |
| 2019/0300060 A1 | 10/2019 | Otsuka | |

FOREIGN PATENT DOCUMENTS

| | | |
|---|---|---|
| JP | 2017-140636 A | 8/2017 |
| JP | 2017177115 A | 10/2017 |
| JP | 6340389 B2 | 6/2018 |
| WO | 2016/140287 A1 | 9/2016 |
| WO | 2018/012603 A1 | 1/2018 |

OTHER PUBLICATIONS

International Search Report issued in PCT/JP2019/018848; mailed Jul. 2, 2019.
The extended European search report issued by the European Patent Office on Feb. 11, 2022, which corresponds to European Patent Application No. 19824688.6-1016 and is related to U.S. Appl. No. 17/053,423.

\* cited by examiner

METHOD FOR MANUFACTURING PRESS-MOLDED ARTICLE

CROSS-REFERENCE TO RELATED APPLICATIONS

This is a national phase application in the United States of International Patent Application No. PCT/JP2019/018848 with an international filing date of May 13, 2019, which claims priority of Japanese Patent Application No. 2018-121198 filed on Jun. 26, 2018 the contents of which are incorporated herein by reference.

TECHNICAL FIELD

The present invention relates to a method for manufacturing a press-molded article.

BACKGROUND ART

A technique for manufacturing an automobile framework member by press molding a metal plate is known. In the technical field, it is required to press-mold not only a metal plate having a constant plate thickness but also a metal plate having a thickened portion in order to cope with various strength designs.

For example, JP 2017-177115 A discloses a press molding technique for press-molding into a hat shape a patchwork blank in which welding plate-shaped patchwork to plate-shaped basework forms a thickened portion.

SUMMARY OF THE INVENTION

In the press molding technique disclosed in JP 2017-177115 A, bending stress is concentrated on the joint portion between the basework and the patchwork, and there is a possibility that unintended cracking or bending may occur at the joint portion.

The present invention has an object to prevent unintended cracking or bending during press molding of a patchwork blank having a thickened portion in a method for manufacturing a press-molded article.

A first aspect of the present invention provides a method for manufacturing a press-molded article including a method for manufacturing a press-molded article, the method including: preparing a patchwork blank in which a thickened portion is formed by welding patchwork to basework; bending only the thickened portion of the patchwork blank; and bending a portion other than the thickened portion in a step different from bending of the thickened portion According to this method, since the steps of the bending are divided between the thickened portion and the other portion, it is possible to prevent stress from concentrating on the joint portion between the basework and the patchwork and to prevent unintended cracking or bending at the joint portion from occurring. Therefore, each portion can be bent accurately. Here, the term "different step" is assumed to be broadly construed, and refers to a step performed in multiple stages, excluding those performed at the same time. Therefore, the "different step" includes not only a step of performing bending to be divided into a plurality of presses but also a step of performing bending with multiple stages in one press. It should be noted that any one of the bending step of the thickened portion and the bending step of the portion other than the thickened portion may be executed first. In addition, "bending" here is a broad concept including drawing.

The patchwork blank may be bent by using a press molding apparatus including a first mechanism configured to bend only the thickened portion and a second mechanism configured to bend a portion other than the thickened portion.

According to this method, since the mechanism for bending the thickened portion and the other portion is divided into the first mechanism and the second mechanism, each of the thickened portion and the other portion can be bent accurately.

The first mechanism may be driven in a vertical direction to apply a press load in a vertical direction to the thickened portion. The second mechanism may include a cam mechanism that converts a press load in a vertical direction of the first mechanism from a vertical direction to an inclined direction, and may cause the cam mechanism to be driven in a direction inclined from a vertical direction to apply a press load in a direction inclined from a vertical direction to a portion other than the thickened portion.

According to this method, with the first mechanism and the second mechanism, two press directions can be achieved with one press molding apparatus. Therefore, a shape having a plurality of bent portions such as a hat shape can be accurately bent. Preferably, the first mechanism and the second mechanism are interlocked with each other to perform two-stage bending with one press of the press molding apparatus.

The first mechanism may include a first bending piece corresponding to a shape of the thickened portion. The second mechanism may include a second bending piece corresponding to a shape of a portion other than the thickened portion.

According to this method, the thickened portion can be bent with the first bending piece, and the portion other than the thickened portion can be bent with the second bending piece. Replacing these two bending pieces with each other to use them makes it possible to achieve two steps of bending with one press molding apparatus having a simple structure.

The patchwork blank may be made of mild steel or hot stamping material.

According to this method, since a member having good bending workability such as mild steel or hot stamping material is used for the patchwork blank, it is possible to further prevent unintended cracking or bending. In addition, it may be necessary to reinforce a member having a relatively low strength such as mild steel or a hot stamping material by providing a thickened portion. Therefore, it is effective to form the thickened portion for reinforcement and to prevent unintended cracking or bending by the above method to achieve accurate bending.

The press-molded article may be a B-pillar of an automobile and may have a hat-shaped cross section.

According to this method, the B pillar can be suitably manufactured. The B-pillar of an automobile requires a certain level of strength to protect the vehicle interior against a side collision. In addition, an accurate hat shape is required in consideration of assembling property. Therefore, using the method described above makes it possible to manufacture a hat-shaped B-pillar having high strength and accuracy.

According to the present invention, in the method of manufacturing a press-molded article, since the bending steps are divided into a step for a thickened portion and a step for a portion other than the thickened portion, it is possible to prevent unintended cracking or bending during press molding of the patchwork blank.

MODE FOR CARRYING OUT THE INVENTION

In the following, embodiments of the present invention will be described with reference to the accompanying drawings.

First Embodiment

Figure 1:
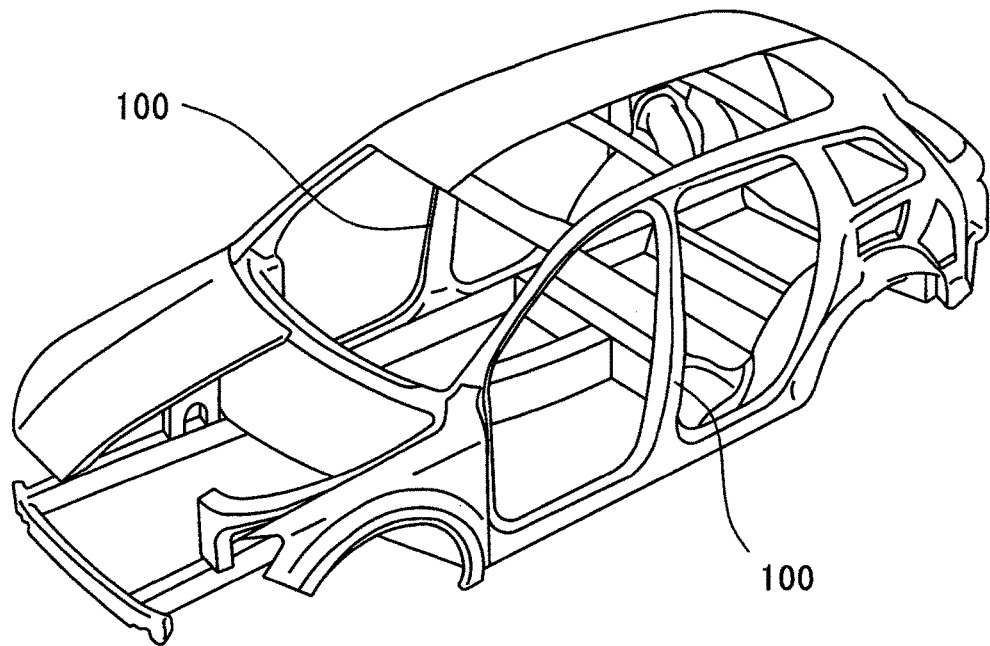
FIG. 1 is a perspective view of an automobile framework.
Figure 2:
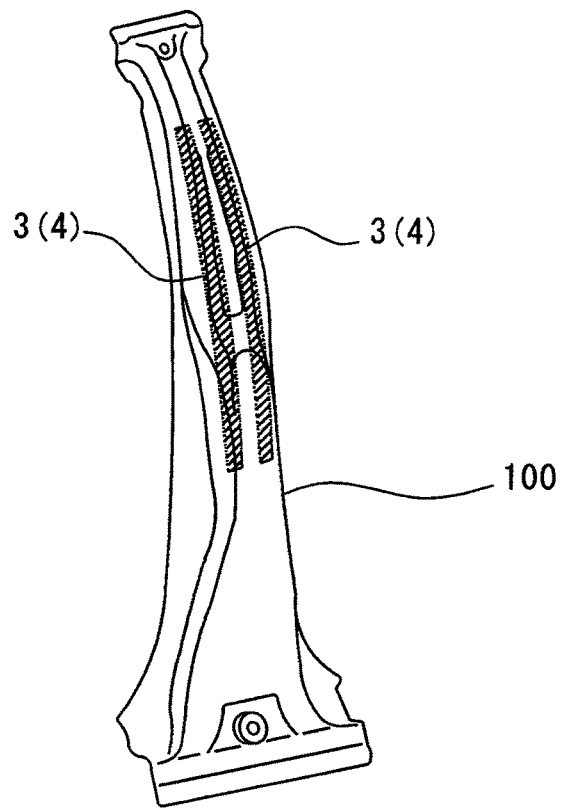
FIG. 2 is a perspective view of a B pillar.

A method for manufacturing a press-molded article according to the present embodiment is to press-mold a patchwork blank to obtain a press-molded article having a desired shape. The present method can be used specifically for forming the members that constitute the framework of an automobile (see FIG. 1). In the following, a method for manufacturing a B-pillar 100 (see FIG. 2) using the present method will be described. As will be described in detail below, this press molding is performed by first bending and second bending.

Figure 3:
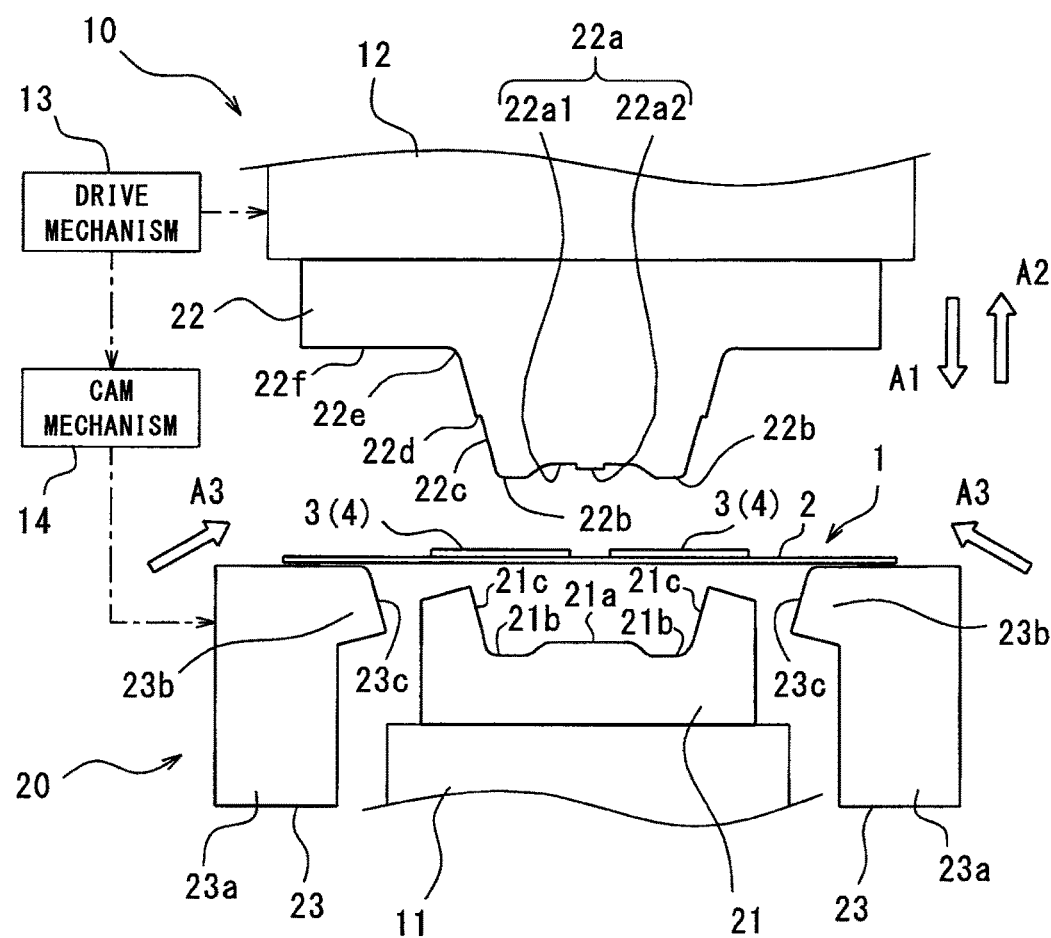
FIG. 3 is a cross-sectional view showing a press molding apparatus that executes a method for manufacturing a press-molded article according to a first embodiment of the present invention.

With reference to FIG. 3, the press molding apparatus 10 is an apparatus for press-molding a plate-shaped patchwork blank 1 into a hat shape. The patchwork blank 1 is obtained by welding two pieces of plate-shaped patchwork 3 to a piece of plate-shaped basework 2 to form two thickened portions 4. The patchwork blank 1 is made of mild steel or hot stamping material and has good bending workability. For example, the thickness of the basework 2 is 1.6 mm or 1.8 mm, and the thickness of the patchwork 3 is 1.8 mm or 2.3 mm.

The press molding apparatus 10 of the present embodiment includes a fixed base 11, a slide plate 12 arranged above the fixed base 11, a die 20, a drive mechanism 13, and a cam mechanism 14. The die 20 includes a lower die 21, a first punch 22, and a second punch 23. In addition, since the detailed configurations of the drive mechanism 13 and the cam mechanism 14 are the same as those generally used for the press molding apparatus 10, detailed description and illustration thereof will be omitted.

The fixed base 11 is fixed and immovable. The lower die 21 is attached to the fixed base 11. Therefore, the lower die 21 is also fixed and immovable.

The lower die 21 has a recessed shape. The bottom surface 21a forming the recessed shape of the lower die 21 is a horizontal flat surface. The left and right both corner portions 21b of the bottom surface 21a are formed one step lower than the flat surface. Thus, when the patchwork blank 1 is molded into a hat shape, drawing for improving strength can be formed at the top portion 110 (see FIG. 8). In addition, the two side surfaces 21c that rise to spread diagonally upward from both corner portions 21b are flat surfaces.

The slide plate 12 is driven in the up-down direction (vertical direction) by the drive mechanism 13, that is, can be raised and lowered (see arrows A1 and A2). In the present embodiment, the drive mechanism 13 is hydraulic type or mechanical type (servo type). The drive mechanism 13 can also stop the raising and lowering of the slide plate 12 and maintain the pressurized state. A first punch 22 is attached to the slide plate 12 so as to protrude downward. Therefore, the first punch 22 can also be raised and lowered.

The first punch 22 has a protruding shape. The protruding-shaped top portion 22a of the first punch 22 has a horizontal flat surface 22a1 and a protruding portion 22a2 protruding from the flat surface 22a1. The protruding portion 22a2 is provided in the center of the first punch 22 in the horizontal direction, and its width is large enough to be arranged between two pieces of the patchwork 3. In addition, the height of the protruding portion 22a2 substantially corresponds to the thickness of the patchwork 3. The left and right both corner portions 22b of the top portion 22a protrude more downward than the top portion 22a. Therefore, during press molding, both corner portions 22b are made to first come into contact with the patchwork blank 1. The side surface 22c that rises to spread diagonally upward from both corner portions 22b is a flat surface with a step 22d. The height of the step 22d roughly corresponds to the thickness of the patchwork 3. Therefore, the surface of the first punch 22 is lowered one step from the protruding portion 22a2 to the step 22d corresponding to the size of the patchwork 3. In addition, during press molding, the position of the step 22d corresponds to the position of the top portion of the lower die 21 in the vertical direction. Therefore, only the thickened portion 4 can be sandwiched between the lower die 21 and the first punch 22. In addition, the side surface 22c of the first punch 22 is connected to the flange surface 22f via the corner portion 22e. The flange surface 22f is a flat surface extending outward in the horizontal direction.

The second punch 23 is arranged below the first punch 22 and on the lateral side of the lower die 21. The second punch 23 is mechanically connected to the cam mechanism 14 and is driven diagonally upward by the cam mechanism 14 toward the first punch 22 (see arrow A3). The cam mechanism 14 converts the driving force in the vertical direction of the drive mechanism 13 (see arrows A1 and A2) into the driving force in the direction inclined from the vertical direction (see arrow A3). The direction inclined from the vertical direction (see arrow A3) is also the direction perpendicular to the side surface 22c of the first punch 22.

The second punch 23 has an approximately L-shape in a front view, and two second punches 23 are arranged on both sides across the lower die 21. The second punch 23 includes a base portion 23a extending in the vertical direction and a tip portion 23b extending horizontally inward (toward the lower die 21) from the upper end portion of the base portion 23a. The side surface 23c of the tip portion 23b faces the side surface 22c of the first punch 22, and is formed substantially parallel to the side surface 22c of the first punch 22 and the side surface 21c of the lower die 21. The upper surface 23d of the second punch 23 faces the flange surface 22f of the first punch 22 and is a flat surface extending in the horizontal direction.

In the present embodiment, the lower die 21, the first punch 22, and the drive mechanism 13 constitute the first mechanism of the present invention, and the first punch 22, the second punch 23, and the cam mechanism 14 constitute the second mechanism of the present invention. It is preferable that the first mechanism and the second mechanism are driven to be interlocked with each other. In the present embodiment, the first mechanism and the second mechanism are interlocked so that each step in FIGS. 4 to 7 described below can be executed by one press of the press molding apparatus 10.

FIGS. 4 to 7 show in order each step of the method for manufacturing a press-molded article according to the present embodiment. It should be noted that in FIGS. 4 to 7, only the patchwork blank 1 and the die 20 (lower die 21, first punch 22, and second punch 23) are shown for clarity of illustration.

Figure 4:
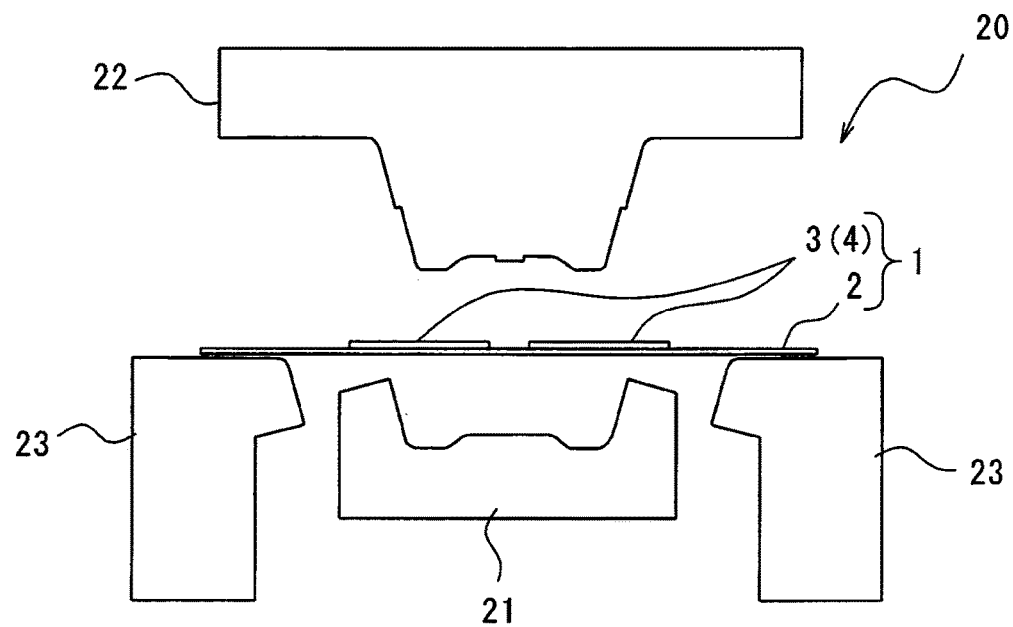
FIG. 4 is a front view showing a preparation step of the first embodiment.

FIG. 4 shows the preparation step. In the preparation step, the patchwork blank 1 is set in the die 20. At this time, the patchwork blank 1 is arranged with the surface to which the patchwork 3 is welded facing up. With this arrangement, when the patchwork blank 1 is press-molded into a hat shape, the patchwork 3 is arranged inside the hat shape, which does not spoil the aesthetic appearance. The first punch 22 and the lower die 21 are arranged vertically spaced apart, and the second punch 23 is arranged on both sides of the lower die 21 in the horizontal direction.

Figure 5:
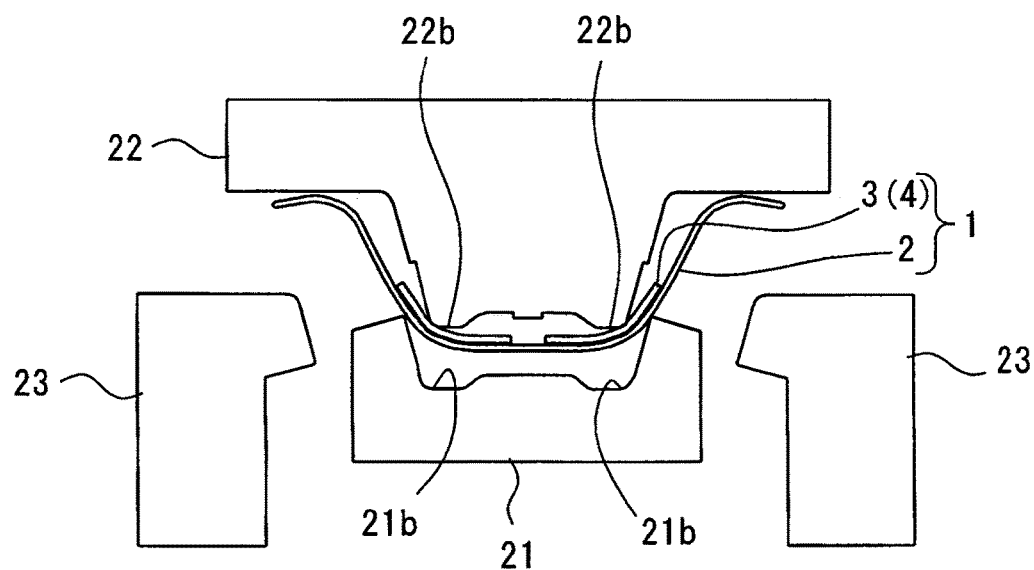
FIG. 5 is a front view showing before the first bending of the first embodiment.
Figure 6:
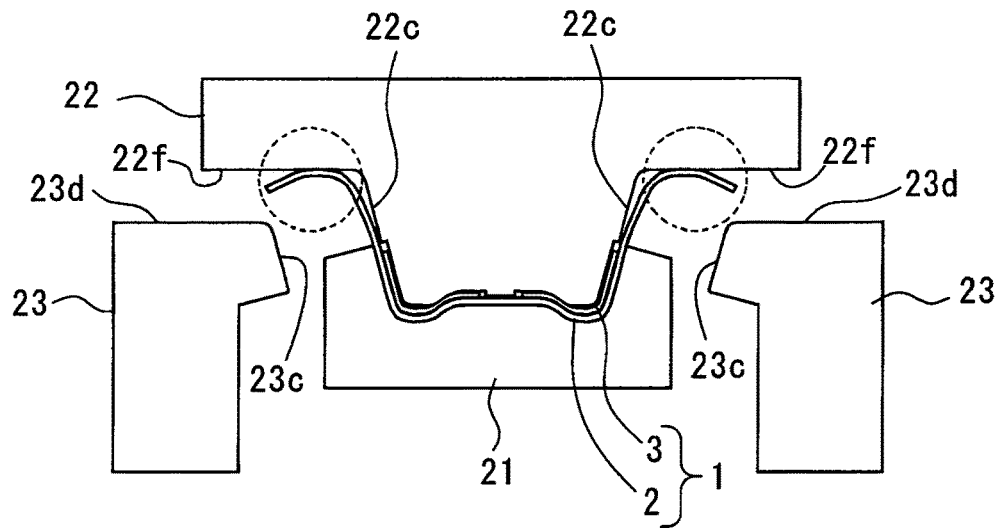
FIG. 6 is a front view showing after the first bending and before the second bending step of the first embodiment.

FIGS. 5 and 6 show the first bending step in which the first bending is performed. FIG. 5 shows before the first bending, and FIG. 6 shows after the first bending. In the first bending step, only the thickened portion 4 is bent. "Only the thickened portion 4 is bent" means that only the thickened portion 4 is sandwiched and bent by press molding, and the portion is formed into the shape of a press-molded article (B pillar 100). Therefore, the portion other than the thickened portion 4 may be partially bent in association with the bending, but the bending does not have the shape of the press-molded article (B pillar 100), and the correction machining or the like is performed later (see the dashed circle in FIG. 6).

In the first bending step, the first punch 22 is lowered by the drive mechanism 13 (see FIG. 3), and both corner portions 22b of the first punch 22 come into contact with the thickened portion 4 of the patchwork blank 1. Then, the thickened portion 4 is sandwiched between both corner portions 21b of the lower die 21 and both corner portions 22b of the first punch 22, and the thickened portion 4 of the patchwork blank 1 is bent. In the present step, a hat-shaped top portion 110 (see FIGS. 2 and 8) is formed.

Figure 7:
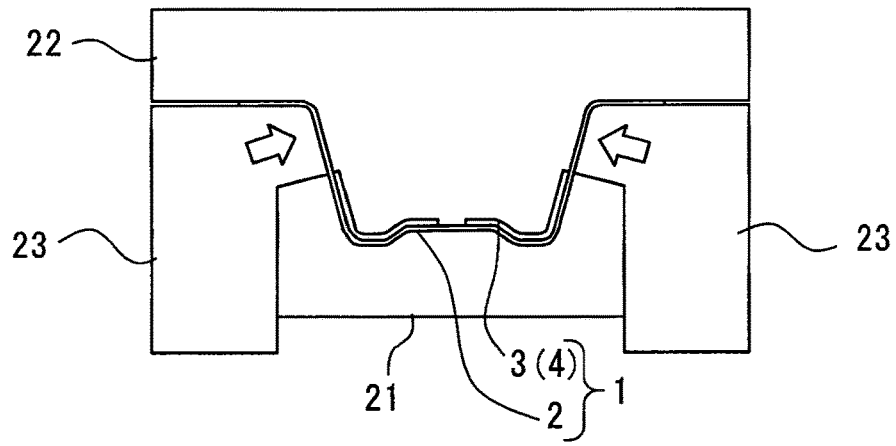
FIG. 7 is a front view showing after the second bending of the first embodiment.

FIGS. 6 and 7 show the second bending step in which the second bending is performed. FIG. 6 shows before the second bending, and FIG. 7 shows after the second bending. In the second bending step, the portion other than the thickened portion 4 is bent. After the first bending, as shown in FIG. 6, only the thickened portion 4 of the patchwork blank 1 is sandwiched between the first punch 22 and the lower die 21. In other words, the portion other than the thickened portion 4 (the hat-shaped brim portion 120 described below) is not sandwiched.

In the second bending step, while maintaining the press pressure of the first punch 22 and the lower die 21 from the state shown in FIG. 6, the second punch 23 receives force from the cam mechanism 14 (see FIG. 3), and is driven diagonally upward (see the arrow in FIG. 7). That is, the second punch 23 is brought close to the patchwork blank 1 from both the left and right sides, and the portion other than the thickened portion 4 of the patchwork blank 1 is sandwiched between the first punch 22 and the second punch 23, and the portion other than the thickened portion 4 is bent. Specifically, the patchwork blank 1 is sandwiched between the side surface 23c of the second punch 23 and the side surface 22c of the first punch 22, and the patchwork blank 1 is sandwiched between the upper surface 23d of the second punch 23 and the flange surface 22f of the first punch 22. In the present step, a hat-shaped brim portion 120 (see FIGS. 2 and 8) is formed.

Figure 8:
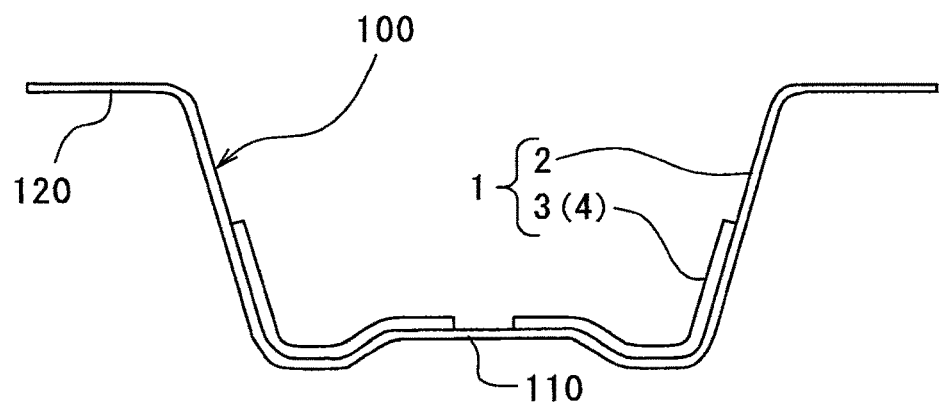
FIG. 8 is a front view showing a patchwork blank press-molded into a hat shape.

In this way, the hat-shaped B-pillar 100 having the thickened portion 4 as shown in FIG. 8 can be manufactured.

According to the present embodiment, there are the following advantages.

Since the steps of the bending are divided between the thickened portion 4 and the other portion, it is possible to prevent stress from concentrating on the joint portion between the basework 2 and the patchwork 3 and to prevent unintended cracking or bending at the joint portion from occurring. Therefore, each portion can be bent accurately. Here, the term "different step" is assumed to be broadly construed, and refers to a step performed in multiple stages, excluding those performed at the same time. Therefore, the "different step" includes not only a step of performing bending to be divided into a plurality of presses but also a step of performing bending with multiple stages in one press. It should be noted that any one of the bending step of the thickened portion 4 and the bending step of the portion other than the thickened portion 4 may be executed first.

Since the mechanism for bending the thickened portion 4 and the other portion is divided into the first mechanism and the second mechanism, each of the thickened portion 4 and the other portion can be bent accurately.

With the first mechanism and the second mechanism, two press directions can be achieved with one press molding apparatus 10. Therefore, a shape having a plurality of bent portions such as a hat shape can be accurately bent. Preferably, the first mechanism and the second mechanism are interlocked with each other to perform two-stage bending with one press of the press molding apparatus 10.

Since a member having good bending workability such as mild steel or hot stamping material is used for the patchwork blank 1, it is possible to further prevent unintended cracking or bending. In addition, it may be necessary to reinforce a member having a relatively low strength such as mild steel or a hot stamping material by providing a thickened portion 4. Therefore, it is effective to form the thickened portion 4 for reinforcement and to prevent unintended cracking or bending by the above method to achieve accurate bending.

The B-pillar of an automobile requires a certain level of strength to protect the vehicle interior against a side collision. In addition, an accurate hat shape is required in consideration of assembling property. Therefore, using the method of the present embodiment makes it possible to manufacture a hat-shaped B-pillar 100 having high strength and accuracy.

Second Embodiment

Figure 9:
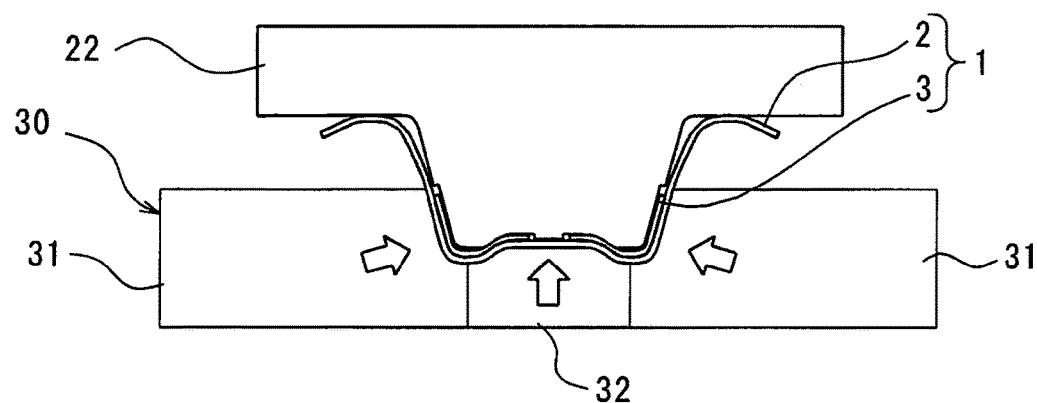
FIG. 9 is a front view showing a first bending step of a second embodiment.
Figure 10:
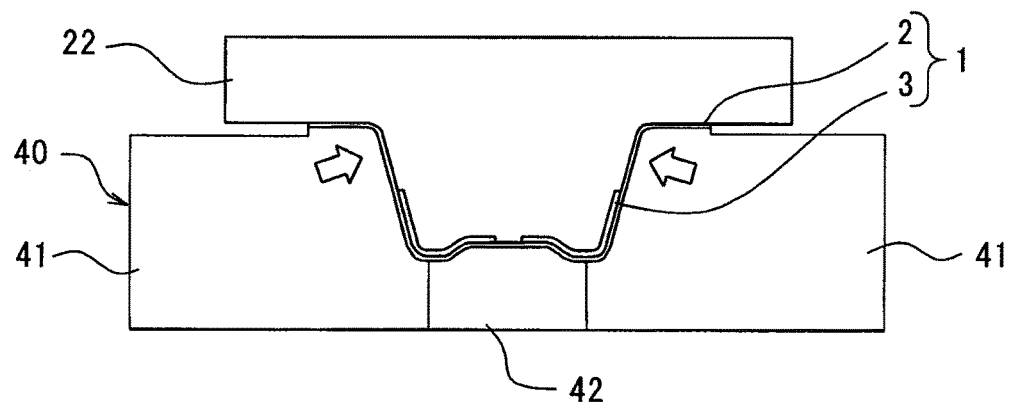
FIG. 10 is a front view showing a second bending step of the second embodiment.

In the second embodiment shown in FIGS. 9 and 10, two types of bending pieces 30 and 40 are used as the lower die 21 (see FIG. 3) of the first embodiment. In addition, the shape of the patchwork 3 is different from that of the first embodiment. Those other than these are substantially the same as those of the first embodiment. Therefore, description of the same portions as of the first embodiment may be omitted.

FIG. 9 shows the first bending step, and FIG. 10 shows the second bending.

In the first bending step, the thickened portion 4 is bent by using the first bending piece 30. The first bending piece 30 has a shape corresponding to the shape of the thickened portion 4. The first bending piece 30 includes a first side part bending piece 31 arranged on the left and right sides of the first punch 22, and a first lower part bending piece 32 arranged between the first side part bending pieces 31. The first side part bending piece 31 is arranged to face the portion from the corner portion 22b to the step 22d of the first punch 22, and the patchwork blank 1 of the portion is sandwiched together with the first punch 22 and bent. The first lower part bending piece 32 is arranged to face the portion from the corner portion 22e to the top portion 22a of the first punch 22, and the patchwork blank 1 of the portion is sandwiched together with the first punch 22 and bent.

In the second bending step, a portion other than the thickened portion 4 is bent by using the second bending piece 40. The second bending piece 40 has a shape also corresponding to the shape of a portion other than the thickened portion 4. The second bending piece 40 includes a second side part bending piece 41 arranged on the left and right sides of the first punch 22, and a second lower part bending piece 42 arranged between the second side part bending pieces 41. The second side part bending piece 41 is arranged to face the portion from the corner portion 22b to the flange surface 22f of the first punch 22, and the patchwork blank 1 of the portion is sandwiched together with the first punch 22 and bent. The second lower part bending piece 42 is the same as the first lower part bending piece 32.

In order to perform the first bending step and the second bending step in one press molding apparatus 10, two presses are performed. Specifically, after the first press is executed in the first bending step, the first bending piece 30 of the press molding apparatus 10 is replaced with the second bending piece 40, and the second press is executed in the second bending step.

(First Modification)

Figure 11:
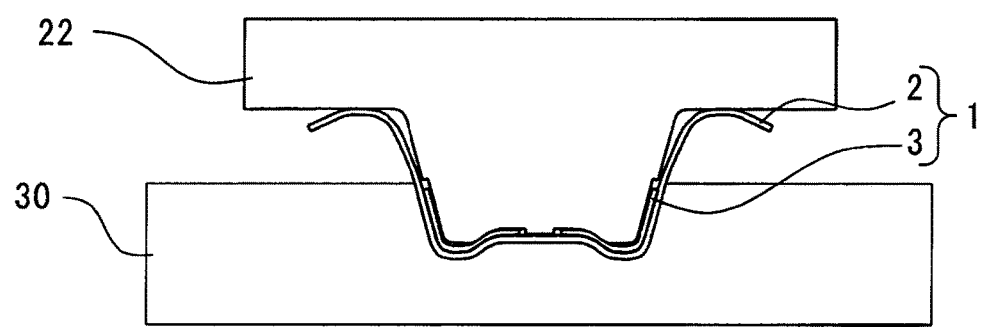
FIG. 11 is a front view showing a first bending step in a first modification of the second embodiment.
Figure 12:
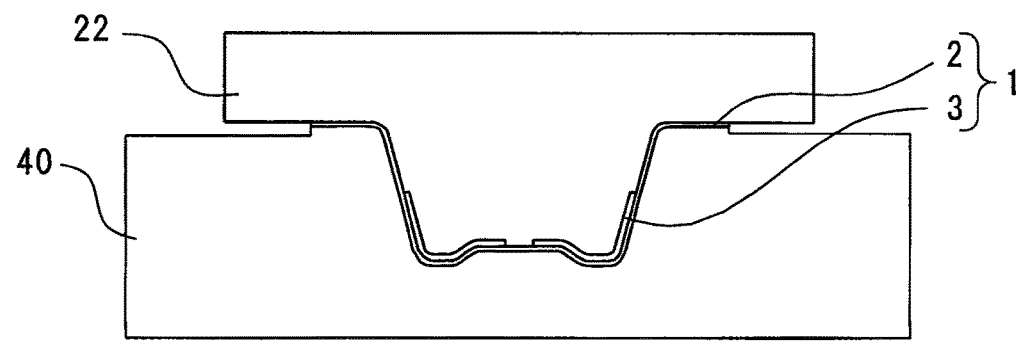
FIG. 12 is a front view showing a second bending step in a second modification of the second embodiment.

As in the first modification of the second embodiment shown in FIGS. 11 and 12, the first bending piece 30 may be an integrated type. Similarly, the second bending piece 40 may also be an integrated type. The mode of bending is the same as described above.

(Second Modification)

Figure 13:
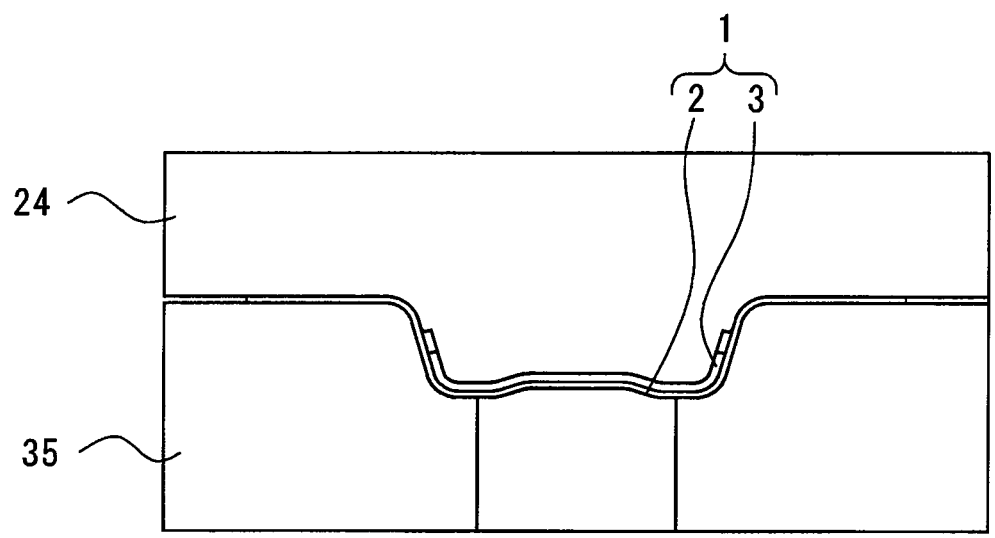
FIG. 13 is a front view showing a first bending step in the second modification of the second embodiment.
Figure 14:
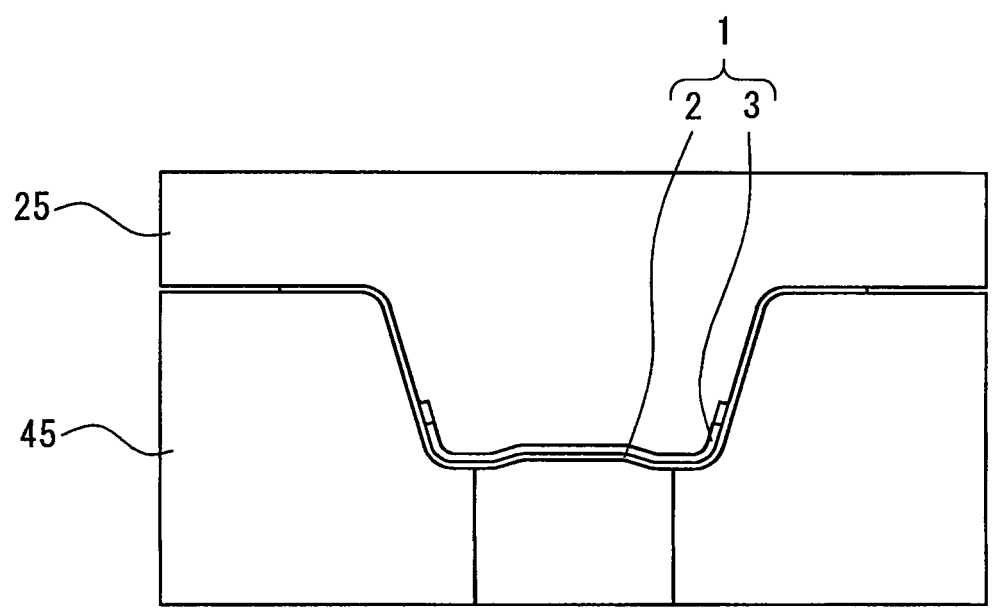
FIG. 14 is a front view showing a second bending step in the second modification of the second embodiment.

As in the second modification of the second embodiment shown in FIGS. 13 and 14, drawing machining (bending) may be performed in two stages. In the present modification, first, with reference to FIG. 13, shallow drawing machining is performed with the first bending piece 35 and the shallow drawing punch 24. Next, with reference to FIG. 14, deep drawing machining is performed with the second bending piece 45 and the deep drawing punch 25.

The shallow drawing punch 24 and the deep drawing punch 25 have substantially the same shape as the first punch 22 (see FIG. 9) of the second embodiment described above. However, in the present modification, the patchwork blank 1 in which one piece of the patchwork 3 is welded to the basework 2 is drawn. The patchwork 3 is welded to the basework 2 to cover the entire top portion 110 (see FIG. 8) when the patchwork blank 1 is formed in a hat shape.

Corresponding to the shape of the patchwork blank 1, the shallow drawing punch 24 and the deep drawing punch 25 of the present modification do not have the above-described protruding portion 22a2 (see FIG. 3). In addition, the shallow drawing punch 24 has a relatively smaller downward protrusion amount than the deep drawing punch 25, and in the present modification, the protrusion amount is about half that of the deep drawing punch 25.

The first bending piece 35 has substantially the same shape as the first bending piece 30 (see FIG. 9) of the second embodiment described above. In addition, the second bending piece 45 also has substantially the same shape as the second bending piece 40 (see FIG. 9) of the second embodiment described above.

According to the present embodiment and its modification, the thickened portion 4 can be bent with the first bending piece 30, and the portion other than the thickened portion 4 can be bent with the second bending piece 40. Replacing these two bending pieces 30 and 40 with each other to use them makes it possible to achieve two steps of bending with one press molding apparatus 10 having a simple structure.

As described above, although the specific embodiments and their modifications of the present invention are described, the present invention is not limited to the above-described embodiments, and can be implemented with various modifications within the scope of the present invention. For example, an appropriate combination of contents of the individual embodiments may be one embodiment of the present invention.

In addition, the application target of the present invention is not limited to the above-described B pillar 100. For example, the present invention can also be applied to door beams, rockers, and the like of vehicle framework members.

In addition, in each of the above embodiments, an example of bending the patchwork blank 1 in which one or two pieces of the patchwork 3 are welded to the basework 2 is described, but the number of pieces of the patchwork 3 to be welded is not particularly limited, and may be three or more. The bending shape of the patchwork blank 1 is not limited to the hat shape, and the patchwork blank 1 can be bent into any shape.

The invention claimed is:

1. A method for manufacturing a press-molded article, the method comprising:
    preparing a patchwork blank in which a multi-layer thickened portion is formed by layering a main surface of a plate-shaped patchwork on a main surface of a plate-shaped basework and welding the patchwork to the basework;
    bending only the thickened portion of the patchwork blank using a press molding apparatus including a first mechanism configured to bend only the thickened portion; and
    bending a portion other than the thickened portion in a step different from bending of the thickened portion using a second mechanism different than the first mechanism;
    wherein the first mechanism is driven in a first direction to apply a press load in the first direction to the thickened portion, and
    wherein the second mechanism is driven to apply a press load in a direction inclined from the first direction to the portion other than the thickened portion.

2. The method for manufacturing a press-molded article according to claim 1, wherein the first mechanism includes a first bending piece corresponding to a shape of the thickened portion, and the second mechanism includes a second bending piece corresponding to a shape of a portion other than the thickened portion.

3. The method for manufacturing a press-molded article according to claim 2, wherein the patchwork blank is made of mild steel or a hot stamping material.

4. The method for manufacturing a press-molded article according to claim 2, wherein the press-molded article is a B-pillar of an automobile and has a hat-shaped cross section.

5. The method for manufacturing a press-molded article according to claim 1, wherein the patchwork blank is made of mild steel or a hot stamping material.

6. The method for manufacturing a press-molded article according to claim 1, wherein the press-molded article is a B-pillar of an automobile and has a hat-shaped cross section.

7. A method for manufacturing a press-molded article, the method comprising:

preparing a patchwork blank in which a thickened portion is formed by welding patchwork to basework;

bending only the thickened portion of the patchwork blank; and bending a portion other than the thickened portion in a step different from bending of the thickened portion, wherein bending the patchwork blank comprises using a press molding apparatus including a first mechanism configured to bend only the thickened portion and a second mechanism configured to bend the portion other than the thickened portion, the first mechanism is driven in a vertical direction to apply a press load in a vertical direction to the thickened portion, and the second mechanism includes a cam mechanism that converts a press load in a vertical direction of the first mechanism from a vertical direction to an inclined direction, and causes the cam mechanism to be driven in a direction inclined from a vertical direction to apply a press load in a direction inclined from a vertical direction to a portion other than the thickened portion.

8. The method for manufacturing a press-molded article according to claim 7, wherein the patchwork blank is made of mild steel or a hot stamping material.

9. The method for manufacturing a press-molded article according to claim 7, wherein the press-molded article is a B-pillar of an automobile and has a hat-shaped cross section.

* * * * *